United States Patent Office 2,862,334
Patented Dec. 2, 1958

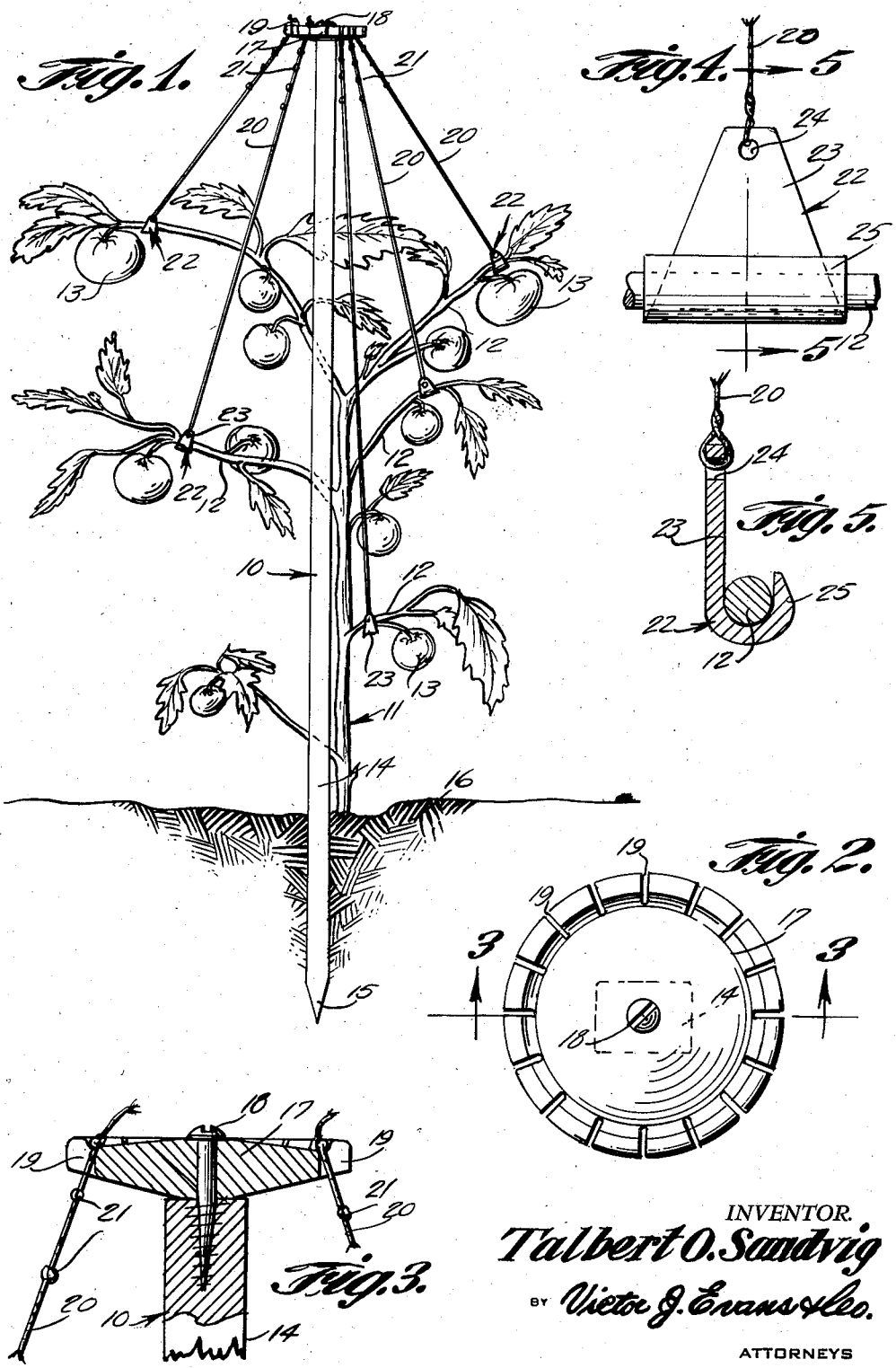

2,862,334

PLANT, VINE OR TREE HOLDER

Talbert O. Sandvig, Oswego, Oreg.

Application March 27, 1957, Serial No. 648,814

1 Claim. (Cl. 47—47)

This invention relates to a support member, and more particularly to a device for use in supporting plants, vines, flowers or the like.

The object of the invention is to provide a support member which is adapted to be used for supporting or maintaining the branches of vines, plants, or the like in raised position.

Another object of the invention is to provide a support member which includes a stake or post that is adapted to be driven into the ground or inserted into the ground, and wherein a plurality of lines extend from a member on top of the post, there being hooks on the lower ends of the lines for engagement with branches of a plant or vine so that such branches will be maintained in their proper raised or elevated position, even when the branches are heavily laden with fruit or the like.

A further object of the invention is to provide a plant, vine or tree holder or support member which is extremely simple and inexpensive to manufacture.

Other objects and advantages will be apparent during the course of the following description.

In the accompanying drawings, forming a part of this application and in which like numerals are used to designate like parts throughout the same.

Figure 1 is a side elevational view showing the support member of the present invention being used.

Figure 2 is a plan view of the support member with the lines removed.

Figure 3 is a sectional view taken on the line 3—3 of Figure 2, and showing several of the lines thereon.

Figure 4 is an elevational view illustrating one of the clamps on the ends of the line.

Figure 5 is a sectional view taken on the line 5—5 of Figure 4.

Referring in detail to the drawings, the numeral 10 indicates the support member of the present invention which is adapted to be used with a plant such as the vine 11, and the vine or plant 11 may be, for example, a tomator plant which includes the usual branches 12 that have fruit such as tomatoes 13 thereon.

The support member 10 of the present invention includes a post or stake 14 which has its lower end pointed as at 15 for facilitating the insertion of the post into the ground 16.

Mounted on the upper end of the post 14 is a circular body member 17, and the body member 17 is secured to the post 14 through the medium of a suitable securing element such as a screw 18, Figure 3.

The body member 17 is provided with a plurality of spaced apart radially disposed slots 19 which extend inwardly on the outer periphery of the body member as shown in Figure 2. There is further provided a plurality of lines or cords 20 which are each provided with a plurality of spaced apart enlargements 21 that define limit stop members. Thus, the stop members 21 are of sufficient size to maintain the lines 20 immobile in their different adjusted positions in the slots 19 so that as shown in Figure 1 the lines can be adjusted to different lengths whereby branches at different elevations or positions can be readily supported.

Connected to the lower end of each of the lines 20 is a hook which is indicated generally by the numeral 22, Figures 4 and 5. Each hook 22 includes a main portion 23 which is provided with an aperture or opening 24 in its upper end for engagement with the lower end of the line 20. Each hook 22 further includes a finger 25 which is adapted to engage a portion of the branch 12 being supported.

From the foregoing, it is apparent that there has been provided a support member which is especially suitable for use with plants or vines such as the plant 11 shown in Figure 1. The plant 11 may be any type of plant or flower or vine such as a tomato plant which includes the usual branches 12 that have fruit such as tomatoes thereon. By means of the support member of the present invention, the branches 12 will be maintained in raised or elevated position, even when loaded with fruit such as the fruit 13. In use, the post 14 is adapted to be arranged contiguous to the plant and the post 14 can be readily inserted or driven into the ground due to the provision of the pointed end 15. The post 14 has the body member 17 on its upper end, the body member 17 is secured to the post 14 in any suitable manner, as for example by means of the screw 18. The body member 17 has a plurality of slots 19 therein, and cords or lines 20 extend through the slots. The lines 20 may have knots or other stop members 21 thereon so that by arranging different of the stop members 21 in engagement with the body members 17, the effective length of the lines 20 can be adjusted as desired so that the hooks 22 can be arranged in engagement with different of the branches 12. Each hook 22 includes a main portion 23 that has an opening 24 that is engaged by the lower end of the line 20, and each hook 22 further includes a finger 25 for engagement with a branch 12.

The parts can be made of any suitable material and in different shapes or sizes.

In Figure 1 a tomato vine is shown being supported by the present invention, but it is to be understood that the device can also be used for different types of plants, flowers or the like. If desired, certain of the parts of the member can be made of plastic, or stamped metal. The slots or grooves 19 are just large enough to permit the lines 20 to slip therethrough, but these slots 19 are not large enough to permit the knots 21 to pass therethrough. The lines 20 can be made of soft wire, or durable cord or plastic line, and the stop members 21 may be in the form of clinched lead pellets, or small metal slips, or tied knots.

I claim:

A support member comprising a post provided with a lower pointed end for insertion in the ground, a body member mounted on the upper end of said post, said body member having a circular formation with rounded edges so as to prevent injury to the plants, vines or the like, a securing element extending through said body member and into said post, there being a plurality of radially disposed slots in said body member extending inwardly from the outer periphery thereof, lines extending through said slots and said lines being provided with a plurality of enlargements defining spaced apart stop members for engagement with said body member; there being an annular depression on the upper surface of said body member contiguous to the ends of said slots for receiving certain of said stop members; a hook connected to the lower end of each of said lines, each of said hooks including a main portion provided with an aperture for engagement with a corresponding line, said main portions having converging side edges and wherein the bottom of the main portion is wider than the upper end thereof, a finger extending from said main portion for engagement with the branch of a flower, plant, vine or the like, said fingers having a curved shape, said slots being large enough to permit the lines to pass therethrough, said slots being small enough to prevent the stop members from passing therethrough, the lines adapted to be adjusted to different lengths whereby branches at different elevations or positions can be readily supported, and whereby the length of the lines can be adjusted as the plant grows.

References Cited in the file of this patent

UNITED STATES PATENTS

| | | |
|---|---|---|
| 1,080,758 | Glascock | Dec. 9, 1913 |
| 1,234,960 | Talbert | July 31, 1917 |
| 1,644,994 | Fowler | Oct. 11, 1927 |
| 1,693,180 | Phelp | Nov. 27, 1928 |

FOREIGN PATENTS

| | | |
|---|---|---|
| 242,296 | Switzerland | Sept. 16, 1946 |